W. H. GIBBS.
SOLDERING MACHINE.
APPLICATION FILED JAN. 25, 1905.

1,016,006.

Patented Jan. 30, 1912.

4 SHEETS—SHEET 1.

Witnesses:
C. F. Mason.
E. M. Allen.

Inventor
W H Gibbs
By Attorneys
Southgate & Southgate

W. H. GIBBS.
SOLDERING MACHINE.
APPLICATION FILED JAN. 25, 1905.
1,016,006.
Patented Jan. 30, 1912.
4 SHEETS—SHEET 2.
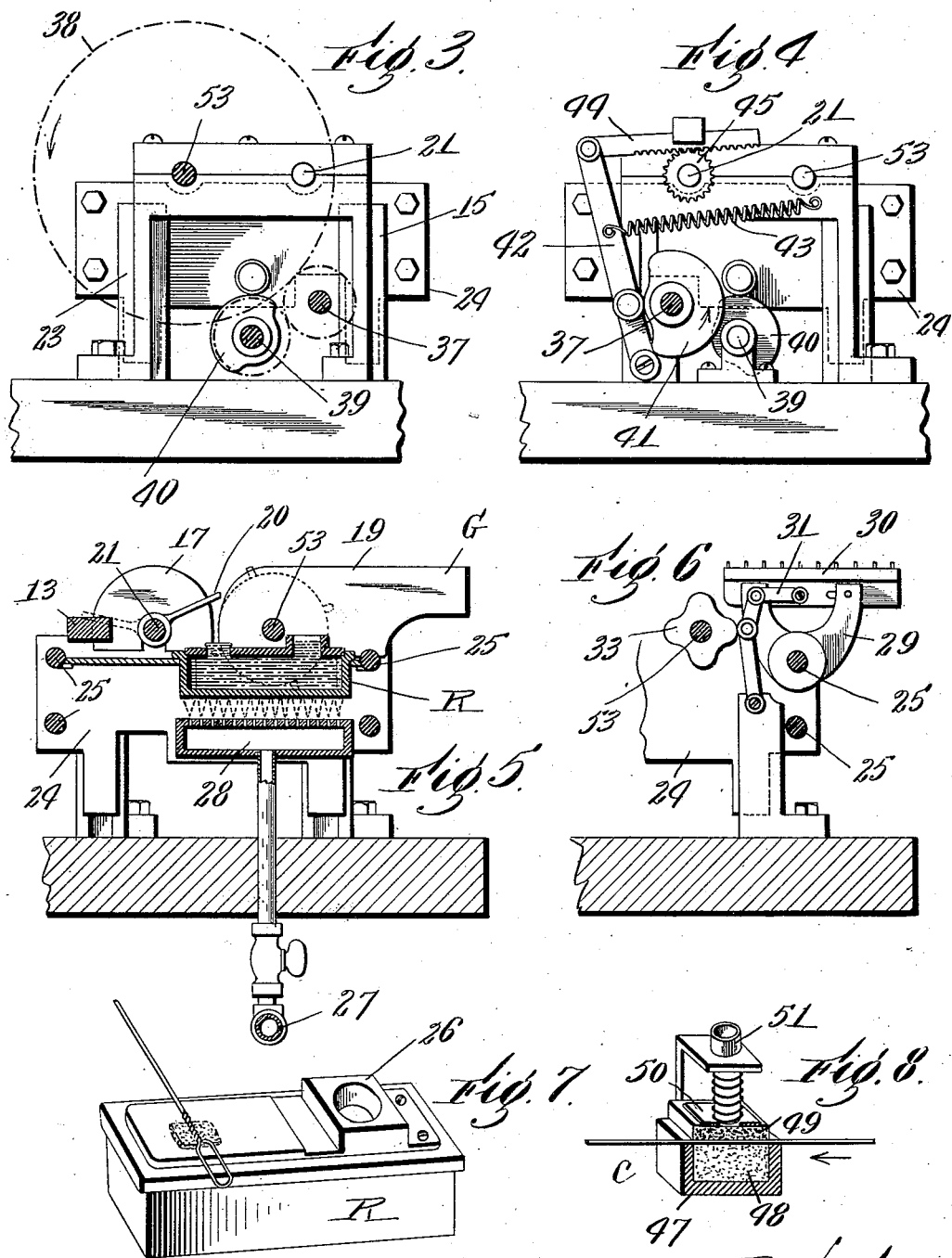

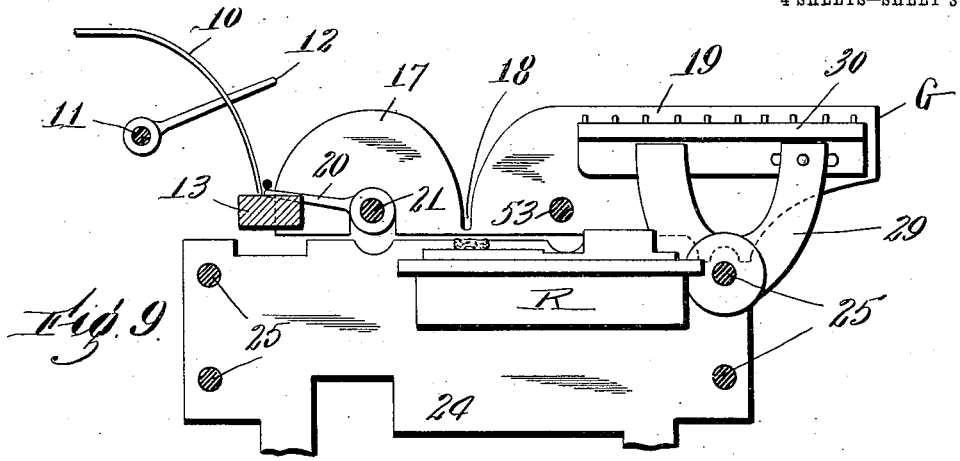
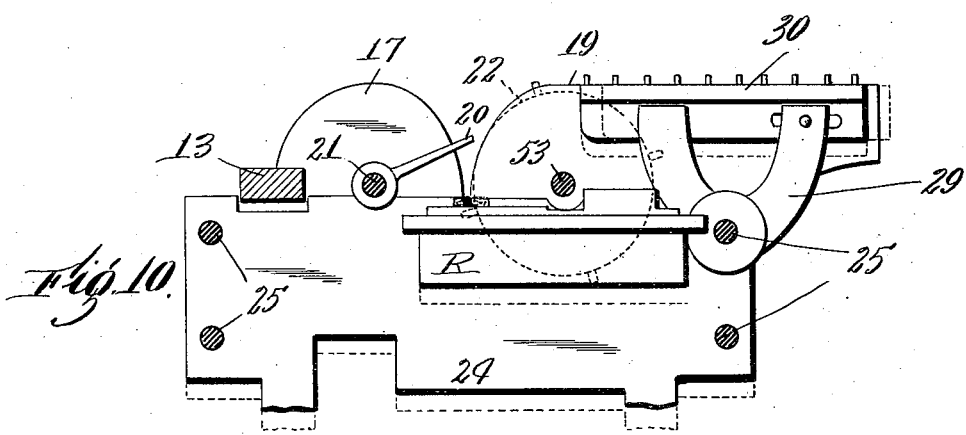
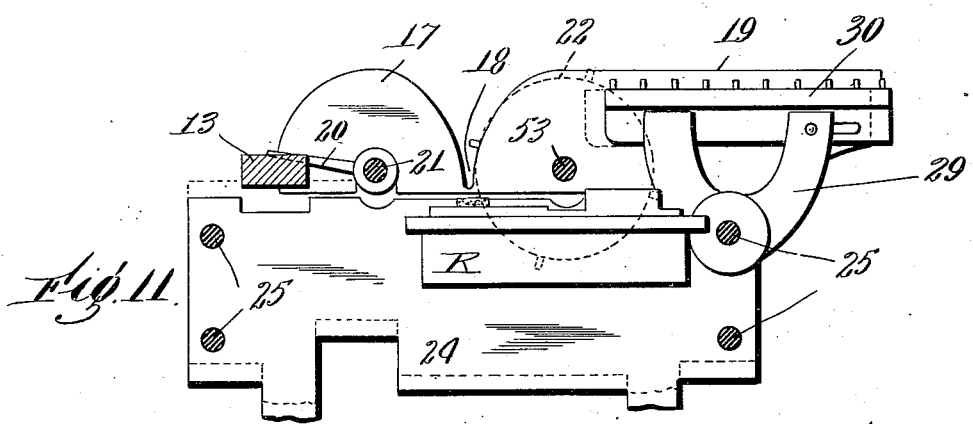

W. H. GIBBS.
SOLDERING MACHINE.
APPLICATION FILED JAN. 25, 1905.
1,016,006.
Patented Jan. 30, 1912.
4 SHEETS—SHEET 4.
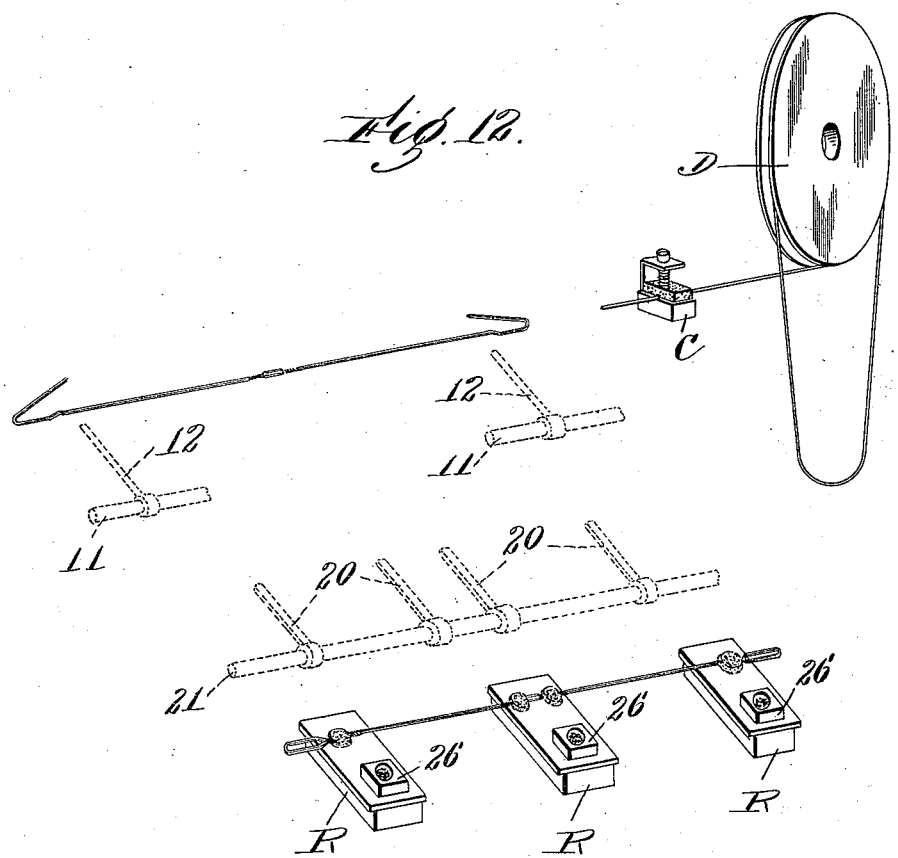
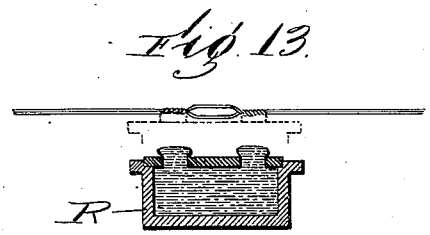
Witnesses:
C. F. Mason.
E. M. Allen.
Inventor:
W. H. Gibbs
By his Attorneys,
Southgate and Southgate

UNITED STATES PATENT OFFICE.

WILLIAM H. GIBBS, OF CLINTON, MASSACHUSETTS, ASSIGNOR, BY MESNE ASSIGNMENTS, TO GIBBS HEDDLE COMPANY, OF LEICESTER, MASSACHUSETTS, A CORPORATION OF MASSACHUSETTS.

SOLDERING-MACHINE.

1,016,006.  Specification of Letters Patent.  Patented Jan. 30, 1912.

Application filed January 25, 1905. Serial No. 242,613.

*To all whom it may concern:*

Be it known that I, WILLIAM H. GIBBS, a citizen of the United States, residing at Clinton, in the county of Worcester and State of Massachusetts, have invented a new and useful Soldering-Machine, of which the following is a specification.

This invention relates to a machine for soldering the twists of wire heddles.

The especial objects of this invention are to provide a simple and efficient form of soldering machine which will utilize solder in the form of molten globules; which will handle the articles to be soldered in a simple, efficient and direct manner; which will expose the finished products upon an inspection rack or table so that defective pieces can be picked out by the attendant: and to provide a machine which is especially adapted for soldering or tinning the twisted portions which are located at different points in the length of a wire heddle.

Reference is to be had to the accompanying four sheets of drawings which show certain preferred forms of the invention, and in which—

Figure 1:
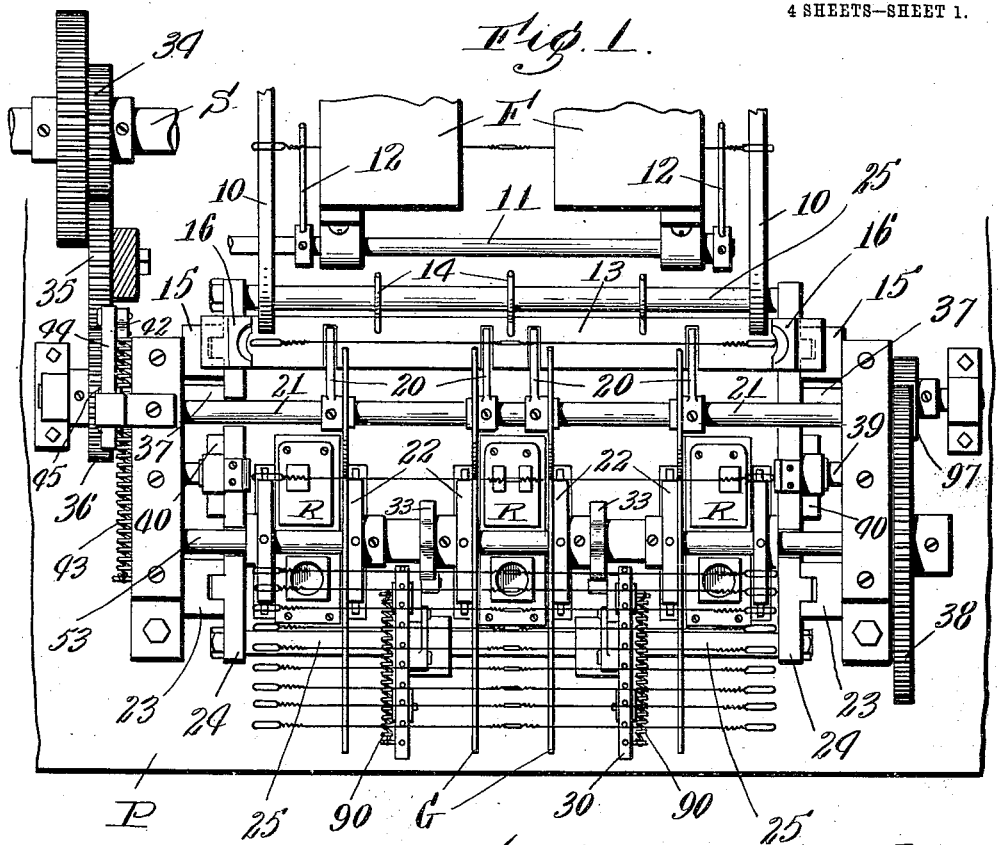
Figure 2:
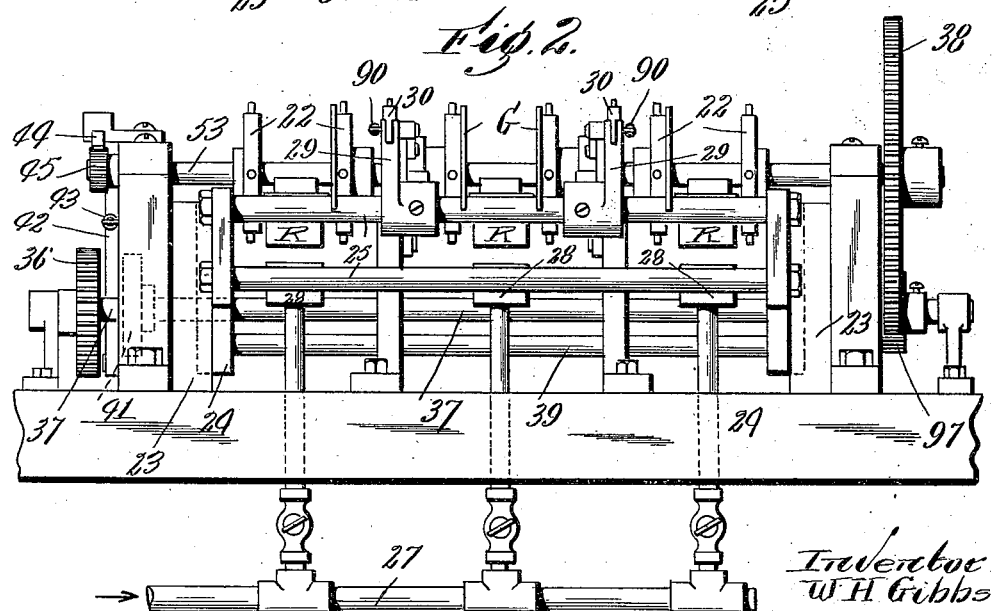

Figure 1 is a plan view of sufficient parts of the mechanism to illustrate the application of this invention to the bed-plate of a heddle making machine. Fig. 2 is a front view of the same. Fig. 3 is a partial end view thereof partly in section. Fig. 4 is a detail view showing the connections for operating the fly fingers. Fig. 5 is a sectional view showing the parts in operative or soldering position. Fig. 6 is a detail view of the connections for operating one of the jogging racks. Fig. 7 is a perspective view of one of the melting-pots or receptacles for the molten solder. Fig. 8 is a detail view of the clamp for cleaning the wire before soldering. Fig. 9 is a sectional view showing a heddle being carried to soldering position. Fig. 10 is a view similar to Fig. 9 showing the position of the parts during the application of the solder. Fig. 11 is a view similar to Fig. 9 showing the heddle delivered onto the inspection table. Fig. 12 is a diagrammatic perspective view showing the path of the wire from the supply spool to the heddle-making machine, and from the heddle making machine to the soldering apparatus, and Fig. 13 is a sectional view of one of the melting-pots or solder receptacles showing the protruding globules of melted solder.

A soldering machine constructed according to this invention has been especially designed for soldering or tinning the twists of the wire heddle which is shown and claimed in United States Letters Patent No. 527,165, granted October 9, 1894, in the name of Hermann Vogelsang, and the accompanying drawings illustrate the application of the soldering machine so that the same can be used in connection with the heddle-making machine which is shown and claimed in United States Letters Patent No. 626,900 granted June 13, 1899 in the name of William H. Gibbs.

In the Vogelsang heddle above referred to, and in fact in all wire heddles, the durability of the heddles can be many times increased by tinning or soldering the twisted sections of the heddle-bodies. To do this in a satisfactory and commercial way it is essential that the heddles should be left perfectly smooth and clean, and without stalactitic projections. I have found that this work can be done to advantage by dipping or passing the heddles through globules of melted solder which are maintained quiescently in the so-called spheroidal state at openings through the tops or cover-plates of closed melting pots or receptacles.

A complete soldering machine is described herein comprising plates or supports; a set of fly fingers which carry successive heddles into position in notches of the supports; a lifting mechanism which raises the melting pots to apply solder to the heddles; lifting wheels which carry the successive heddles away from the position in which they were operated upon; and jogging racks for carrying the finished heddles over the supports which form an inspection table on which the completed heddles will be exposed so that the attendant can pick out the imperfectly formed or soldered heddles.

Referring to the accompanying drawings and in detail, as shown in Figs. 1 and 2, P designates the base-plate of a heddle making machine, such for example, as illustrated in my United States Letters Patent No. 626,900 before referred to. Supported on the base plate P are frames F which form parts of the heddle making machine, and need not be herein shown or described in full. Coöperating with the frames F to deliver heddles through transverse openings in the front thereof are fly-fingers 12 carried by a rock shaft 11. The fingers 12 carry the successive heddles down over guide-ways 10 and deliver the heddles onto a plate 13 having guide fingers 14. The plate 13 is carried by posts 15 extending up from the base-plate P. The plate 13 is provided with end guides 16 which will guide the heddles accurately into position when dropped upon the plate 13. Extending forward from the plate 13 are supports or plates G.

As shown most clearly in Figs. 9 to 11 inclusive, each of the plates G comprises a substantially semi-circular rise 17, a notch 18, and a horizontal extension 19 on which the completed heddles are displayed for inspection.

From the plate 13 the heddles are raised by fly fingers 20 carried by the shaft 21, and are dropped into the notches 18 of the plates G where the heddles are successively soldered or tinned by the lifting up of the soldering receptacles, as hereinafter described.

After each heddle is soldered it is lifted by the lifting wheels 22 to the horizontal part or inspection table 19 of the plates G, and all of the heddles resting on the inspection table formed by the horizontal extensions of the plate G are intermittently jogged or moved along by jogging racks 30 which are operated as hereinafter described.

Considering now the particular mechanism whereby solder is applied to the heddles as they are successively brought to position in the notches 18, 24 designates side-plates which are vertically movable in the uprights or posts 15 and 23. Connecting the side-plates 24 are rods 25. The side-plates 24 and rods 25 form a vertically movable framework. Mounted on the rods 25 of this vertically movable framework, as illustrated most clearly in Fig. 5, are the melting pots or receptacles R for the molten solder.

As shown most clearly in Fig. 12, three melting pots are employed. The melting pot at each end consists of a receptacle having a closed cover or top with a slightly raised feed opening or spout 26, and in the cover or top-plate of the receptacle R is an opening or hole of the required size to maintain a projecting globule of molten solder of the proper size to solder one of the twists of a heddle. The center receptacle is of the same construction except that it is provided with two delivery openings.

The melting pots may be heated by any ordinary means. For example, as shown in Figs. 2 and 5, 27 designates a gas pipe which supplies three burners 28. A mixed supply of gas and air is furnished through the pipe 27 to the burners 28, one burner being located beneath each of the melting pots to keep the solder thoroughly molten and liquid.

In the continued use of the soldering apparatus small pieces of solder are dropped into each receptacle from time to time so that the receptacles will be kept full and the delivery opening of each receptacle will maintain a protruding globule of molten solder which will project up above the surface of the top plate thereof.

In practice I have found that a globule of molten solder may be made to protrude for a considerable fraction of an inch from a delivery opening of one of the melting pots as thus constructed, and that the use of these globules of molten solder in soldering heddles permits me to solder the twists at separated points of the length of a heddle without defacing or applying solder to any of the intermediate points of the heddles, and by mounting the solder receptacles in a vertically movable framework, the framework may be raised after each heddle is brought into position to be operated upon.

As shown in Fig. 3, 40 designates one of the lifting cams which are mounted on a shaft 39 and engage rollers or pins projecting from the side-plates 24.

Any convenient arrangement of gearing may be used for driving one of my soldering machines.

As shown most clearly in Fig. 1, S designates one of the shafts of the heddle making machine before referred to. Mounted on the shaft S is a gear 34 which meshes with and drives an intermediate 35. Driven from the intermediate 35 is a gear 36 on the cross-shaft 37. Secured on the opposite end of the cross shaft 37 is a gear 97 which meshes with and drives a gear 38 on the cross shaft 53. Also driven from the gear 97 as shown by dotted lines in Fig. 3, is a gear which turns the shaft 39 which carries the lifting cams 40 before referred to.

The connections for operating the fly fingers which move the successive heddles into place are most clearly illustrated in Fig. 4. As shown in this figure, the shaft 37 is provided with a cam 41 which engages a roller carried by a lever 42. The roller is normally held in contact with this cam by means of a spring 43. At its upper end the lever 42 is pivotally connected with a rack 44 which meshes with and drives a gear 45 on the shaft 21 which carries the fly fingers.

The connections for operating the jogging racks 30 which move the finished heddles out along the inspection table are most clearly illustrated in Fig. 6. As shown in this figure, 29 designates the stationary brackets which extend up from one of the cross-rods 25 of the vertically movable frame. The jogging rack 30 has a pin and slot connection with the brackets 29, and each of the jogging racks 30 is connected by a link 31 to a lever carrying a roller engaged by a cam 33 on the cross-shaft 53. By means of this construction when the frame is lifted to apply solder to a heddle, the jogging racks are carried up and the pins of the jogging racks are extended up between the finished heddles. The jogging racks are then given a slight forward motion to move the completed heddles along the inspection table, and when the jogging racks have moved down with the frame, they are permitted to move back to normal position under the tension of the springs 90 shown in Fig. 1.

An understanding of the operation of a completed soldering machine constructed according to this invention, and of the combination of such a soldering machine with the heddle forming machine can best be had from Fig. 12 of the drawings. As shown in this figure, the supply of wire (preferably the double stranded wire for making heddles according to the Vogelsang patent before referred to) is drawn from a supply spool or reel D from which the wire is slacked off slightly more rapidly than called for by the heddle-making machine. The wire as it is drawn from the supply spool D is passed through a brightening or cleaning clamp C. The preferred construction of cleaning clamp which I employ is shown in Fig. 8. Referring to this figure, 47 designates a box or receptacle containing absorbent material 48. Coöperating with the box 47 is a plunger 50 carrying a pad 49 of absorbent material. The plunger 50 is carried by a spring-pressed tube 51 and in practice any desired soldering fluid can be poured into the tube 51 to clean and brighten the wire so as to make the same ready for soldering.

After the wire has passed the cleaning clamp C, as shown in Fig. 12, it is formed into a heddle by a heddle-making machine from which the completed heddles are delivered laterally and soldered or completed by the application of solder from the receptacles R. That is to say, in combining a soldering machine constructed according to this invention with a heddle making machine, the wire is preferably delivered longitudinally to the heddle making machine, properly cleaned and prepared for soldering, the heddles are formed in the heddle making machine, and are delivered laterally therefrom, being completed or finished by the soldering apparatus.

I am aware that numerous changes may be made in practicing this invention by those who are skilled in the art without departing from the scope thereof as expressed in the claims. For example, while some of my soldering machines have been directly combined with the heddle making machines, others of my soldering machines have been used as separate and distinct instrumentalities to which the heddles to be soldered have been supplied by hand.

I am also aware that although my soldering machine has been especially designed for soldering or tinning heddles, machines constructed according to my invention may be used for soldering or tinning other small articles. I do not wish, therefore, to be limited to the construction I have herein shown and described, but What I do claim and desire to secure by Letters Patent of the United States is:—

1. A soldering device, comprising a receptacle for melted solder having a delivery opening, and an elevated feed spout adapted to furnish sufficient head to cause molten solder to protrude from said delivery opening in the form of a globule of sufficient size to surround the article to be soldered, said receptacle having a substantially horizontal surface adjacent said delivery opening for retaining the globule.

2. A soldering device, comprising a receptacle for melted solder having a top plate provided with a delivery opening, means for furnishing a head of molten solder communicating with the solder in the receptacle to cause the molten solder at the delivery opening to form a globule, said top plate having a substantially flat surface adjacent said delivery opening to retain the globule, and means for moving wires or the like successively over the delivery opening and submerging them in the globule.

3. In a soldering machine, the combination of means for holding melted solder, a feed mechanism adjacent thereto comprising notched supporting strips, the notches thereof being located on opposite sides of the position in which the solder is held, and a set of fly-fingers for moving successive pieces to be soldered into the notches of the supporting strips.

4. In a soldering machine, the combination of movable means for holding metal solder, supporting strips located on opposite sides of said means, said strips having notches located opposite the position in which the solder is held, and a set of oscillatable fly-fingers for moving successive pieces to be soldered into the notches of said supporting strips.

5. In a soldering machine, the combination of a receptacle for melted solder having a delivery opening which maintains a protruding globule of solder, and a feed mechanism for bringing successive articles into position to be soldered, comprising supporting strips, and a set of fly-fingers for moving successive articles to be soldered into notches of the supporting strips.

6. In a soldering machine, the combination of a receptacle for melted solder having a delivery opening which maintains a protruding globule of solder, a feed mechanism comprising notched supporting strips, a set of fly-fingers for moving successive pieces into the notches of the supporting strips, and a delivery mechanism for delivering the completed articles.

7. In a soldering machine, the combination of a receptacle for melted solder having a delivery opening which maintains a protruding globule of solder, a feed mechanism for bringing successive articles into position to be soldered, a delivery mechanism for delivering the completed articles, an inspection table, and means for slowly moving the completed articles over the inspection table so that imperfect articles may be picked out by an attendant.

8. In a soldering machine, the combination of a receptacle for melted solder having an opening which maintains a protruding globule of solder, a feed mechanism presenting successive articles in position to be soldered, lifting wheels raising the completed articles to an inspection table, and a jogging mechanism for moving the completed articles slowly along the inspection table so that imperfect articles may be picked out by an attendant.

9. In a soldering machine, the combination of a receptacle for melted solder, a feed mechanism, a lifting device for raising articels from the solder receptacle, an inspection table for receiving articles from said lifting mechanism, and a jogging mechanism for moving the completed articles along the inspection table.

10. In a soldering machine, the combination of means for applying solder, means for raising articles therefrom, an inspection table for receiving articles from the raising means, and a jogging mechanism for moving the completed articles along the inspection table.

11. In a heddle soldering machine, the combination of a receptacle having a plurality of openings, each of which maintains a protruding globule of solder, a feed mechanism for feeding successive wire heddles into position to have solder applied to the twisted portions thereof from said globules, a delivery mechanism for delivering the completed heddles, an inspection table, and means for moving the completed heddles over the inspection table so that imperfect heddles may be picked out by an attendant.

12. In a heddle soldering machine, the combination of a feed mechanism automatically presenting heddles in position to be soldered, means for applying solder to the twisted portions of the heddles, a delivery mechanism for delivering the completed heddles, an inspection table, and means for moving the completed heddles over the inspection table so that imperfect heddles may be picked out by an attendant.

13. In a heddle soldering machine, the combination of notched plates or supports, a set of oscillating fingers for depositing successive heddles in the notches of the supports, and means for applying solder to the twisted portions of the heddles.

14. In a heddle soldering machine, the combination of a set of oscillating fingers delivering successive heddles from a heddle-making machine, notched supporting plates, a second set of oscillating fingers delivering successive heddles to the notches of the supports, and means for applying solder to the twisted portions of the heddles.

15. In a heddle soldering machine, the combination of a feed mechanism presenting successive heddles in position to be acted upon, means for applying solder to the twisted portions of the heddles, and lifting wheels having projecting pins for raising and delivering completed heddles.

16. In a heddle soldering machine, the combination of a feed mechanism presenting successive heddles in position to be operated upon, means for applying solder to the twisted portions of the heddles, lifting wheels having projecting pins delivering completed heddles to an inspection table, and a jogging motion for moving the completed heddles over the inspection table so that imperfect heddles may be picked out by an attendant.

17. In a heddle soldering machine, the combination of a feed mechanism presenting successive heddles in position to be operated upon, means for applying solder to the twisted portions of the heddles, means for delivering the completed heddles to an inspection table, and means for moving the completed heddles over the inspection table comprising racks having pins, and means for raising the racks and moving the same forward to advance the heddles for depressing the racks out of engagement with the heddles, and then moving said racks back to normal position.

18. In a heddle soldering machine, the combination of means for applying solder to heddles, means for delivering completed heddles to the inspection table, and means for moving completed heddles over the inspection table, said last named means comprising racks having pins, and means for raising the racks and moving the same forward to advance the heddles for depressing the racks out of engagement with the heddles and then moving said racks back to normal position.

19. In a soldering machine, the combination of means for applying solder to a succession of articles, an inspection table and means for moving the soldered articles over the inspection table, said last named means comprising racks having pins, and means for raising the racks for moving the same forward to advance the soldered articles and for depressing the racks out of engagement with the soldered articles.

20. In an apparatus of the class described, the combination of means for supplying unsoldered heddles to a heddle soldering machine, means for feeding the heddles out of the heddle soldering machine transversely to their length and presenting them in position to be acted upon, means for applying solder to the twisted portions of the heddles, means for delivering the completed heddles to an inspection table, and means for advancing the completed heddles over the inspection table so that imperfect heddles may be picked out by an attendant.

21. In a machine of the class described, the combination of means for feeding wire longitudinally into position to be cut into lengths, means for feeding the lengths laterally, and means for applying solder to said lengths at a plurality of points simultaneously.

22. In a machine of the class described, the combination of means for feeding wire longitudinally into position to be cut into lengths, means for feeding the lengths laterally, means for applying solder to said lengths at a plurality of points simultaneously, means for feeding them out laterally, and means for delivering them.

23. A soldering machine, comprising means for holding molten solder having a plurality of delivery openings spaced apart and in alinement, means for causing the molten solder to protrude through said openings in the form of globules, and means for retaining said molten solder quiescently in a spheroidal state at said openings, whereby wire-like bodies may be soldered at a plurality of points in their length.

24. A soldering machine, comprising means for holding molten solder having a plurality of delivery openings spaced apart, means for causing the molten solder to protrude through said openings in the form of globules, and a flat surface for holding the molten solder protruding through said openings in globular condition, whereby articles may be soldered at a plurality of points by submerging them in said globules.

In testimony whereof I have hereunto set my hand, in the presence of two subscribing witnesses.

WILLIAM H. GIBBS.

Witnesses:
PHILIP W. SOUTHGATE,
E. M. ALLEN.

Copies of this patent may be obtained for five cents each, by addressing the "Commissioner of Patents, Washington, D. C."